3,125,072
METHOD AND APPARATUS FOR HEATING LIQUID FOR HOT WATER FLOODING
Harry Brandt and Joseph F. Chittum, Whittier, Calif., assignors to California Research Corporation, San Francisco, Calif., a corporation of Delaware
Filed June 7, 1961, Ser. No. 115,429
5 Claims. (Cl. 122—4)

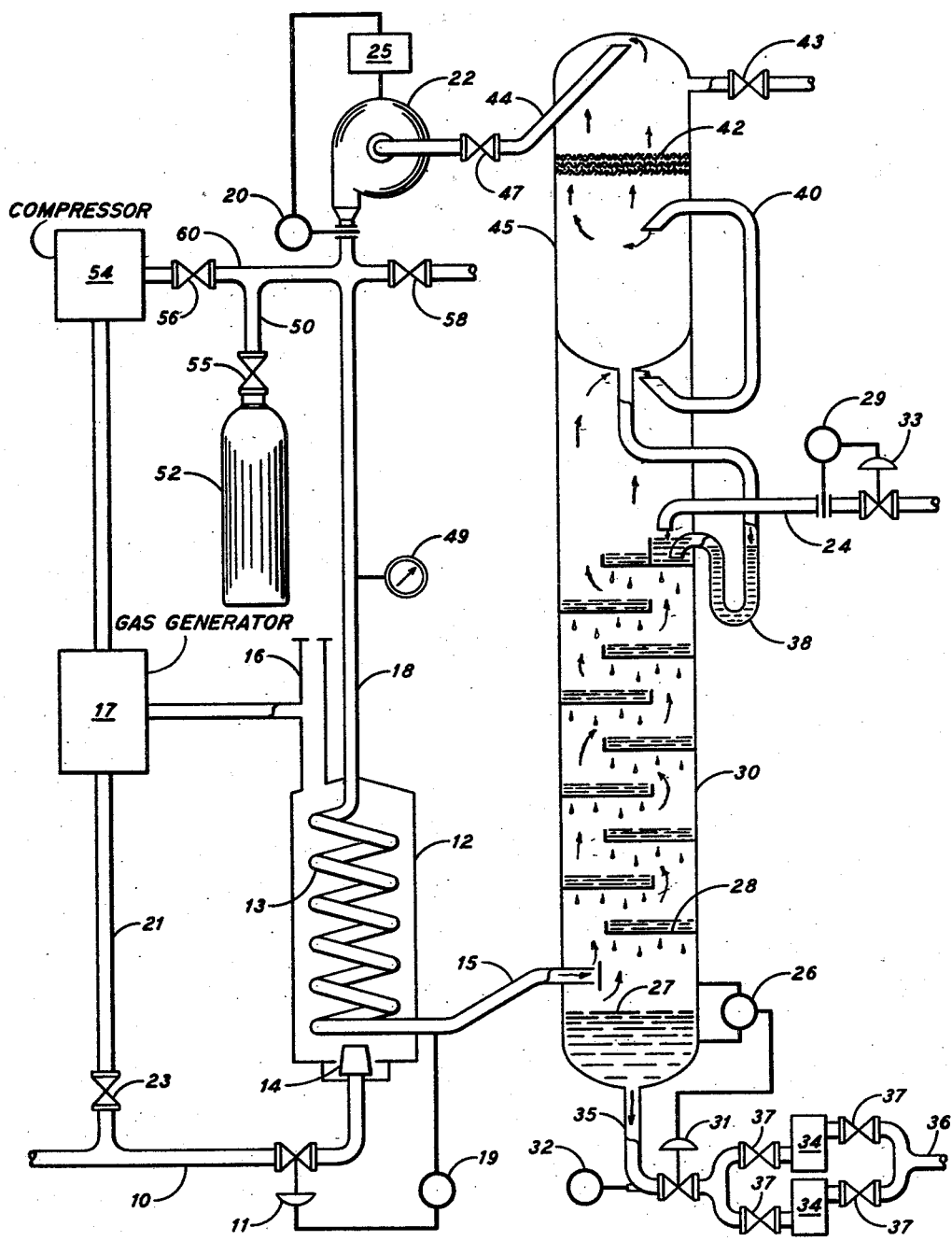

This invention relates to heating liquid and more particularly, this invention relates to a method of heating large quantities of brine by flowing brine in direct contact with a hot circulating gas.

In many petroleum and mining operations it is desirable to utilize large quantities of relatively hot water. For example, water in the temperature range from 200° to 450° is useful in secondary recovery flooding of oil-bearing formations, or in sulphur mining. Unfortunately, the water which is available for these operations often contains many impurities which will cause scaling of metal heat transfer surfaces or precipitate salts with limited solubility as the temperature of the water is increased thus reducing the efficiency of the heating apparatus. As used herein brine means water containing any type of inorganic salt in solution which when heated will cause scaling on metal surfaces or will cause precipitates to be formed. In order to increase the temperature of brine, special methods are required. It is in this general area that the present invention finds its utility.

It is an object of the present invention to provide an improved method and apparatus for increasing the temperature of brine, such as, for example, to a temperature of above 200° F. by passing a critically adjusted hot gas in direct-contact heat exchange relationship with said brine.

Briefly, the present invention provides a method and apparatus for increasing the temperature of brine by initially increasing the temperature of a critically adjusted, substantially non-absorbable circulating gas to a predetermined high value, flowing the increased-temperature circulating gas in direct-contact heat exchange relationship with the brine in a heating column, thereby increasing the temperature of the brine and decreasing the temperature of the circulating gas, collecting the circulating gas and removing the increased temperature brine from the heating column.

Further objects and advantages of the present invention will become apparent from the following detailed description read in light of the accompanying drawing which is a part of the present specification.

FIG. 1 is a diagrammatic view partially in section of one embodiment of apparatus suitable to perform the method of the present invention.

Referring specifically to FIG. 1, a heat exchanger 12 is shown. Fuel entering burner 14 from gas supply conduit 10 is combusted and the heat thereby released is transferred to a circulating gas contained in the coil 13 of heat exchanger 12. The circulating gas contained in coil 13 is heated to any desired temperature by regulating the amount of gas supplied to burner 14 or by regulating the rate of flow of the circulating gas through the heat exchanger 12. The combustion gases, after passing through coil 13, are vented through stack 16.

The amount of gas supplied to burner 14 is regulated by a temperature-sensitive controller 19 that actuates valve 11 located in gas supply conduit 10. The temperature-sensitive controller 19 controls the temperature of the hot circulating gas that flows from the heat exchanger through insulated conduit 15 to a heating column 30. The rate of flow of the circulating gas is controlled by a flow controller 20 which regulates the speed of blower 22 by means of speed control 25.

The circulating gas contained in the coil 13 is preferably a gas that would not add appreciably to the corrosivity of the system. Preferred gases include nitrogen, methane, and the rare gases such as argon. Gases containing free oxygen are in the corrosion promoting category and are not desirable for use in the system. The preferred gases are relatively non-absorbable in brine. Gases with a high rate of absorption in brine are not desirable for use in the invention. A gas such as steam which is strongly absorbed by brine is therefore not desirable.

The circulating gas is heated in heat exchanger 12 to a high temperature. The temperature is preferably in the range of about 1200° F. The gas is circulated at a pressure at least sufficient to prevent boiling the brine in heating column 30. The circulation pressure also depends to a lesser degree on the equilibrium carbon dioxide pressure of the particular brine and on the pressure drop required to circulate the gas through the system at the preselected flow rate. A pressure range of 250 to 400 p.s.i., for example, is preferred when the brine is to be heated to a temperature of about 400° F.

The circulating gas preferably contains a critical amount of carbon dioxide. The carbon dioxide content of the circulating gas is critically adjusted to prevent precipitation of carbonates from the brine during the heating process. The carbon dioxide content of the circulating gas may be expressed as a partial pressure. A preferred range of partial pressures when brine is to be heated to about 400° F. is 6 to 50 p.s.i. The carbon dioxide partial pressure that must be maintained in the circulating gas depends on the bicarbonate ion and the calcium ion contents of the heated brine. The carbon dioxide content of the circulating gas is adjusted to maintain these ions in solution in the brine. The carbon dioxide content necessary to keep the salts in solution will vary with different brine compositions. It may be necessary to continually adjust the composition of the circulating gas depending on the particular composition of the brine being heated.

One means of obtaining the critically adjusted circulating gas comprises first generating a gas by means of gas generator 17. The gas generator 17 combusts fuel gas supplied through conduit 21 and valve 23 using the exhaust gases taken from stack 16 of heat exchanger 12. The gas generator 17 is operated in such a manner that no free oxygen remains in the gas there produced because free oxygen adds to the corrosivity of the system. The gas generator is adjusted to produce a gas, for example, of approximately 85% nitrogen and 15% carbon dioxide. The gas from gas generator 17 is supplied to compressor 54 which delivers the gas through valve 56 and conduit 60 to the circulating gas system.

A high pressure source 52 of a preferred circulating gas, for example, nitrogen, is provided with a conduit 50 connecting circulating gas source 52 and conduit 60 through valve 55. Source 52 supplies nitrogen to be added to the gas produced in gas generator 17 so that the desired partial pressure of carbon dioxide may be obtained in the circulating gas in conduit 60. Source 52 is adjustable by means of valve 55 to make up any nitrogen lost during the process. Circulating gas that does not have the proper composition and that cannot be made to the proper composition is selectively wasted from the system through valve 58. Valves 56 and 55 provide means for selectively communicating between the circulating gas supply system and the heat exchanger 12.

Alternatively the critical carbon dioxide adjustment of the circulating gas is accomplished by providing a source of carbon dioxide (not shown) under pressure in communication with a source 52 of circulating gas such as nitrogen or methane. The carbon dioxide may be added to the system in a manner well known to those skilled in the art so that the desired partial pressure of carbon dioxide is obtained in the circulating gas.

The circulating gas leaving heat exchanger 12 at a predetermined high temperature flows through insulated conduit 15 to brine heating column 30 at a predetermined rate. The heating column 30 is insulated to prevent heat loss from the exterior surface. The hot circulating gas enters the heating column 30 at a level below the lowest tray 28 and above liquid level 27 in the bottom of the column. Incoming brine to be heated is admitted into heating column 30 through brine inlet means 24. The hot circulating gas and brine are flowed in direct-contact heat exchange relationship in heating column 30. The flow rate of the incoming brine is controlled by flow controller 29 and valve 33. Flow controller 29 is adjustable to allow brine to flow into the heating column at a predetermined volumetric rate. Heating column 30 is provided with an insulated hot brine outlet means 35. Flow through outlet means 35 is controllable by valve 31 actuated by level controller 26. Level controller 26 maintains the level of the brine in the bottom of the column at a level below insulated conduit 15. By proper adjustment of flow controller 29 and level controller 26 the heating column 30 may be operated as a continuous flow heater. Alternately heating column 30 is operable as a batch heater, but continuous flow operation is preferred. The temperature of the brine leaving the heating column 30 is controlled by the rate of brine flow through heating column 30 and/or by the temperature and volume of circulating gas flow through heating column 30. A temperature recorder 32 indicates the temperature of the brine that leaves heating column 30 through outlet means 35.

Heating column 30 is preferably provided with sufficient trays, like tray 28, to provide for intimate contact between the brine and hot circulating gas. The diameter of the heating column 30 is governed primarily by vapor and liquid traffic considerations well known to persons skilled in the art. The height of the column is primarily governed by the heat transfer considerations between the hot circulating gas and the brine to be heated. Requirements for adequate clearance at the top and the bottom of the column necessary respectively for the removal of entrained water droplets from the circulating gas leaving the column, and the removal of the brine from the bottom of the column are also important.

The top of heating column 30 is preferably provided with a mist separator 45. Mist separators are known in the art and there are many units adaptable for use in the method of the invention. A mist separator 45 suitable for use in the method of the invention is shown in FIG. 1. Circulating gas leaving the top section of heating column 30 through conduit 40 enters the middle portion of mist separator 45. The gas entry into mist separator 45 is in a cyclonic pattern which causes droplets to separate from the circulating gas. The gas then flows upwardly in mist separator 45 through screen 42. Screen 42 takes out additional droplets of brine that might still be present in the gas. The circulating gas, now substantially free of brine, leaves mist separator 45 through insulated conduit 44. Condensed brine collected in the bottom of mist separator 45 drains back into heating column 30 through conduit 38. Valve 43 on mist separator 45 is a release valve. Valve 43 may be manually operated or valve 43 may be adjusted to open on the occurrence of a predetermined pressure condition.

Insulated conduit 44 carries the circulating gas through valve 47 to a recirculating blower 22. The recirculating blower is alternatively a standard centrifugal blower or a reciprocating compressor of the size required to maintain the predetermined flow of circulating gas. Conduit 18 carries the now compressed gas to tube 13 in heat exchanger 12 from where the gas is recirculated. Flow controller 20 controls the flow of circulating gas in conduit 18 by controlling the speed of the blower 22 with speed control 25. Pressure gauge 49 indicates the pressure of the circulating gas in the conduit 18.

The hot brine is filtered by means of filters 34 before the brine leaves the system at exit conduit 36. Preferably two alternating filters 34 are installed in the system to allow operation of one of the filters while the other filter is taken out of service for cleaning. The selective use of the filters is accomplished by means of valves 37. The filters operate to trap any precipitate or any other particulate matter from the brine.

The upper temperature limit for precipitation-free heating of the brine by the method herein provided depends on the calcium ion, magnesium ion, bicarbonate ion and sulfate ion contents of the particular brine to be heated. In order to keep precipitation at a minimum, the maximum temperature of the brine must not exceed the more or less critical solubility temperature of $CaCO_3 \cdot CaSO_4$ and some magnesium salts. At temperatures between 400 to 450° F. the solubilities of $CaCO_3$, $CaSO_4$ and the magnesium salts decrease at a rapid rate with increasing temperature. If it is desired to heat the brine to a higher temperature while keeping precipitation to a minimum, a particular brine may need to be softened by additives before the brine is conducted through the heating process. When it is desired to increase the temperature of brine to about 400° F. for example, the brine and circulating gas must be contacted at a pressure well above the equilibrium water vapor pressure of the brine at this temperature plus the equilibrium carbon dioxide pressure of the brine at this temperature. This total pressure indicated by gauge 49 is preferably in the range of 250 to 400 p.s.i.

As is obvious from the above description, the invention provides a novel method of heating brine without the occurrence of heat transfer or precipitation problems since the heat transfer is accomplished by direct flow relationship between a critically adjusted circulating gas and brine. Although only one arrangement of apparatus is illustrated, it will be obvious to those skilled in the art that the method could be accomplished with a variety of apparatus.

The invention having been fully described, we claim:

1. The method of increasing the temperature of brine above about 200° F. comprising increasing the temperature of an oxygen-free gas, flowing said increased temperature gas in direct contact heat-exchange relationship with brine to heat the brine and cool the gas, separating the now cooled gas from said brine and removing residual droplets of said brine from said gas, increasing the temperature of the cooled gas and again flowing said gas in direct contact heat-exchange relationship with brine to heat the brine and cool the gas.

2. A method of heating brine comprising adjusting the carbon dioxide content of an oxygen-free gas to a value so that the partial pressure of the carbon dioxide in said gas is between about 6 and 50 p.s.i. when the total pressure on the gas is above about 250 p.s.i., increasing the temperature of said gas to above about 1200° F., passing said gas in direct contact heat-exchange relationship with brine at a pressure of above about 250 p.s.i. to heat the brine and cool the gas, separating the now cooled gas from the brine and removing residual droplets of brine from said gas, again increasing the temperature of said gas to above about 1200° F. and passing the increased temperature gas in direct contact heat exchange with brine.

3. The method of claim 2 further characterized by the step of again adjusting the carbon dioxide content of the gas after the step of separating the cooled gas and the brine.

4. A method of increasing the temperature of brine comprising selecting a gas from the group consisting of nitrogen, methane and the rare gases, adjusting the carbon dioxide content of said gas so that the carbon dioxide will have a partial pressure in said gas of between 6 to 50 p.s.i., increasing the temperature of said gas to above about 1200° F., passing said gas in direct contact heat-exchange relationship with brine at a pressure of above about 250 p.s.i. to heat the brine and cool the gas, separating the now cooled gas from the brine and removing the residual droplets of said brine from said gas, again increasing the temperature of said gas and again passing said increased temperature gas in direct contact heat exchange with brine.

5. Apparatus for heating brine comprising a brine heating column having brine inlet means and brine outlet means and gas inlet means and gas outlet means, a high pressure source of gas, means connecting said source of gas with said gas inlet means, heat exchange means for increasing the temperature of said gas prior to flow of said gas into said brine heating column, mist separating means for removing residual droplets of brine from said gas, means connecting said mist separating means with said gas outlet means of said brine heating column, and means connecting said mist separating means to said gas inlet means whereby gas from said mist separating means is recirculated through said brine heating column.

References Cited in the file of this patent

UNITED STATES PATENTS

| | | |
|---|---|---|
| 1,927,148 | Behrman | Sept. 19, 1933 |
| 2,182,286 | Doennecke et al. | Dec. 5, 1939 |
| 2,759,328 | Cockrell | Aug. 21, 1956 |
| 3,026,261 | Mayfield et al. | Mar. 20, 1962 |
| 3,041,274 | Love et al. | June 26, 1962 |

FOREIGN PATENTS

| | | |
|---|---|---|
| 15,231 | Australia | Aug. 22, 1929 |
| 761,863 | France | Jan. 13, 1934 |